(12) United States Patent
Wu et al.

(10) Patent No.: US 7,864,901 B2
(45) Date of Patent: Jan. 4, 2011

(54) SYSTEM, APPARATUS, AND METHOD FOR CANCELLING INTERFERENCES OF RECEIVED SIGNALS

(75) Inventors: Wen-Rong Wu, Hsinchu (TW); Ku-How Yang, Kaohsiung (TW)

(73) Assignee: Mediatek, Inc., Hsinchu (TW)

( * ) Notice: Subject to any disclaimer, the term of this patent is extended or adjusted under 35 U.S.C. 154(b) by 599 days.

(21) Appl. No.: 11/970,614

(22) Filed: Jan. 8, 2008

(65) Prior Publication Data

US 2009/0175392 A1    Jul. 9, 2009

(51) Int. Cl.
*H03D 1/04*  (2006.01)
*H03D 1/06*  (2006.01)
*H03K 5/01*  (2006.01)
*H03K 6/04*  (2006.01)
*H04L 1/00*  (2006.01)
*H04L 25/08* (2006.01)

(52) U.S. Cl. .................. 375/346; 375/260; 375/316; 375/324; 375/340

(58) Field of Classification Search .............. 375/260, 375/316, 324, 346
See application file for complete search history.

(56) References Cited

U.S. PATENT DOCUMENTS 6,614,766 B1 *  9/2003  Seki et al. ............... 370/286
7,254,197 B2 *  8/2007  Heo et al. ................ 375/347
7,792,536 B2 *  9/2010  Yoon ....................... 455/501

* cited by examiner

*Primary Examiner*—Ted M Wang
(74) *Attorney, Agent, or Firm*—Thomas, Kayden, Horstemeyer & Risley, LLP

(57) ABSTRACT

An apparatus and a method for cancelling an interference of each of a plurality of received signals are provided. The apparatus comprises an estimation module, an ordering module, a selection module, an equalizer, and a cancellation module. The estimation module estimates a plurality of estimated channels according to a first predetermined number of pilot-tones. The ordering module decides a decision order for processing. The selection module selects a second predetermined number of the received signals as the second predetermined number of processing signals. The equalizer estimates the estimated values, wherein each of the estimated values corresponds to a processing signal. The decision module decides a decided value for each of the estimated values. The cancellation module cancels the interference for each of the processing signals according to the corresponding decided value and the corresponding channel. Then, the estimation module further estimates the estimated channels according to the pilot-tones and a plurality of estimated values.

18 Claims, 6 Drawing Sheets

SYSTEM, APPARATUS, AND METHOD FOR CANCELLING INTERFERENCES OF RECEIVED SIGNALS

CROSS-REFERENCES TO RELATED APPLICATIONS

Not applicable.

BACKGROUND OF THE INVENTION

1. Field of the Invention

The present invention relates to a system, an apparatus, and a method for cancelling interferences of received signals. More particularly, the present invention relates to a system, an apparatus, and a method for cancelling interferences of received signals according to pilot tones and processed data.

2. Descriptions of the Related Art

Orthogonal frequency division multiplexing (OFDM) is one of common transmission techniques that has been wildly used in wireless communications. In a highly-mobility OFDM system, channels would change rapidly. As the result, the orthogonality between sub-carriers would be destroyed and inter-carrier interferences (ICI) would be induced. A received signal that has been transmitted through this noisy channel may contain erroneous messages as well.

FIG. 1 illustrates a conventional OFDM system, which comprises a transmitter 11 and a receiver 12. The transmitter 11 comprises a source bit generator 111, a signal mapper 112, a serial to parallel converter (S/P) 113, an inverse fast Fourier transform (IFFT) 114, a guard interval adder 115, a parallel to serial converter (P/S) 116, and a transmitting antenna 117. The receiver 12 comprises a receiving antenna 121, an S/P 122, a guard interval remover 123, an FFT 124, an ICI mitigation module 125, a decision mechanism 126, a P/S 127, and a signal demapper 128.

In sequence, the source bit generator 111 first generates a plurality of bits for transmission, and the signal mapper 112 can map the bits generated by the source bit generator 111 into a formatted signal. The S/P 113 converts the formatted signal into an original input parallel signal $\tilde{x}$ 101. The IFFT 114 then applies an IFFT operation to the original input signal $\tilde{x}$ 101, resulting in an IFFT signal. The guard interval adder 115 adds guard intervals to the IFFT signal to derive a guarded signal for the P/S converter 116 to convert the guarded signal into a serial form. The transmitting antenna 117 then transmits the signal.

In the receiver 12, the receiving antenna 121 receives a serial signal transmitted from the transmitter 11 through the transmission channel 13. The transmission channel 13 is a time-varying multipath channel. The S/P 122 converts the serial signal into a parallel signal. Then, the guard interval remover 123 removes the guard interval to derive an unguarded signal. Thereafter, the FFT 124 applies the FFT operation to the unguarded signal to derive an interfered signal $\tilde{y}$ 102. As a note, the ICI mitigation 125 has to cancel the aforementioned ICI within the interfered signal $\tilde{y}$ 102 in order to derive the original input signal $\tilde{x}$ 101. After that, the decision mechanism 126, the P/S 127, and the signal demapper 128 perform their corresponding operations to derive the original source bits.

FIG. 2 illustrates a conventional SIC block 2 that is able to cancels the ICI. The convention SIC block 2 can play the role of the ICI mitigation block 125 in FIG. 1. The SIC block 2 comprises a minimum mean square error (MMSE) equalizer 211, a hard decision module 212, a channel gain module 213, a multiply module 214, a delay module 215, and an add module 216. This type of approach strongly depends on channel estimation. Its performance is usually not satisfactory because the channel is estimated according to a few pilot tones.

Before going into the details of the SIC block 2, the signal model of an OFDM system is first addressed. The time domain signal model usually presents a signal as:

$$y(k) = \sum_{l=0}^{N-1} h(k, l)x(k - l) + z(k),$$

wherein x(k) denotes the input signal, y(k) denotes the received signal, h(k,l) represents the $l^{th}$ channel tap at time instant k, N represents the number of sub-carriers, and z(k) represents noise. The received signal of the N sub-carriers can be expressed in the vector form as y=Hx+z.

The frequency domain model usually represent the signal $\tilde{y}=\tilde{H}\tilde{x}+\tilde{z}$, wherein $\tilde{y}$ represents the received model in the frequency domain, $\tilde{x}$ represents the input model in the frequency domain, $\tilde{H}$ represent the ICI channel matrix, and $\tilde{z}$ represents the noise in the frequency domain. Furthermore, $\tilde{H}=GHG^H$, wherein G represents a fast Fourier transform (FFT) matrix.

One of the tasks of the receiver 12 is to recover the signal $\tilde{x}$ 101 from the interfered $\tilde{y}$ 102. The SIC block 2 successively cancels the interference to achieve that. First, $\{S_1, S_2, \ldots, S_N\}$ are ordered according to their power in a decreasing manner, wherein each of the $S_i$ corresponds to a column of $\tilde{H}$. Then, the SIC block 2 performs successive ICI cancellations according to $\{S_1, S_2, \ldots, S_N\}$ in order.

The function of the MMSE equalizer 211 is to minimize the cost function, $E[\|\tilde{x}-Q^H y\|^2]$. Thus, the MMSE equalizer 211 is derived the following way:

$$Q = \left(\hat{H}^H \hat{H} + \frac{\sigma_{\tilde{z}}^2}{\sigma_{\tilde{x}}^2} I_{N \times N}\right)^{-1} \hat{H}^H,$$

wherein $\hat{H}$ represented the estimated channel. The estimation of $\hat{H}$ is then substituted into the MMSE equalizer.

To be more specific, the interfered signal $\tilde{y}$ 102 is inputted both into the MMSE equalizer 211 and the delay module 215. In the order $\{S_1, S_2, \ldots, S_N\}$, the SIC block 2 processes the signal related to $S_i$ in sequence. The MMSE equalizer 211 generates an equalized signal 201, $\bar{x}_{S_i}=q_{S_i}^H y^{i-1}$, corresponding to $S_i$. The equalized signal 201 is then inputted to the hard decision module 212 to derive a decided signal 202, $\hat{d}_{S_i}$. The channel gain $\hat{h}_{S_i}$ 203 corresponding to the decided signal 202 is provided. The multiply module 214 multiplies the decided signal 202 and the channel gain $\hat{h}_{S_i}$ 203 to derive a reconstructed signal 204. The delay module 215 delays the interfered signal $\tilde{y}$ 102 for a predetermined length of time to derive a delayed signal 205. Then, the add module 216 adds the delayed signal 205 and the negative of the reconstructed signal to remove the interference and get an output signal $\tilde{y}^i = \tilde{y}^{i-1} - \hat{h}_{S_i}\hat{d}_{S_i}$.

However, the performance of this type of method relies highly on the accuracy of channel estimation. Due to the limited number of pilot tones, the channel response cannot be accurately estimated. Thus, the performance is unsatisfactory most of the time. Consequently, a system, an apparatus, and a method that cancels ICI accurately are still critical issues in this field.

SUMMARY OF THE INVENTION

An objective of the present invention is to provide a method for cancelling an interference of each of a plurality of received signals. The method comprises the following steps: (a) estimating a channel according to a first predetermined number of pilot-tones, wherein the channel comprises a plurality of sub-carriers and each of the sub-carriers is corresponded to one of the received signals; (b) deciding a decision order relating to the sub-carriers; (c) selecting a second predetermined number of the received signals as the processing signals according to the decision order; (d) estimating an estimated value for each of the processing signals; (e) deciding a decided value for each of the estimated values; (f) estimating the channel according to the pilot-tones and the estimated values; and (g) canceling the interference of each of the processing signals according to the corresponding decided value and the corresponding sub-carrier.

Another objective of the present invention is to provide an apparatus for cancelling an interference of each of a plurality of received signals. The apparatus comprises an estimation module, an ordering module, a selection module, an equalizer, and a cancellation module. The estimation module is configured to estimate a channel according to a first predetermined number of pilot-tones, wherein the channel comprises a plurality of sub-carriers and each of the sub-carriers corresponds to one of the received signals. The estimation module is further configured to estimate the channel according to the pilot-tones and a plurality of estimated values. The ordering module is configured to decide a decision order relating to the sub-carriers. The selection module is configured to, thereafter, select a second predetermined number of the received signals as the processing signals. The equalizer is configured to estimate the estimated values, wherein each of the estimated values corresponds to one of the processing signal. The decision module is configured to decide a decided value for each of the estimated values. The cancellation module is configured to cancel the interference of each of the processing signals according to the corresponding decided value and the corresponding channel.

A further objective of the present invention is to provide a wireless receiving system for canceling an interference of each of a plurality of received signals. The wireless receiving system comprises a receiving interface, an estimation module, an ordering module, a selection module, an equalizer, a decision module, and a cancellation module. The receiving interface is configured to receive the received signals. The estimation module is configured to estimates a channel according to a first predetermined number of pilot-tones and to estimate the channel according to the pilot-tones and a plurality of estimated values, wherein the channel comprises a plurality of sub-carriers and each of the sub-carriers corresponds to one of the received signals. The ordering module is configured to decide a decision order relating to the sub-carriers. The selection module is configured to select a second predetermined number of the received signals as the first processing signals according to the decision order. The equalizer is configured to estimate the estimated values, wherein each of the estimated values corresponds to one of the first processing signals. The decision module is configured to decide a decided value for each of the estimated values. The cancellation module is configured to cancel the interference of each of the first processing signals according to the corresponding decided value and the corresponding sub-carrier.

The present invention utilizes both the original pilot tones and estimated values to re-estimate the channel. Because both the size of the pilot tones (the original pilot tones and the estimated data) is enlarged and the channel is re-estimated iteratively, the estimated channel would be more accurate. Consequently, the interferences canceling rate for each of the received signals could be improved as well. The resultant received signals are thus more correct. Alternatively, to reduce the complexity, a fast algorithm for the MMSE equalizer could be utilized.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the exemplary embodiment, it is assumed that in a time-varying channel, OFDM symbols can be approximated linearly. Of course, the present invention should not be limited thereto.

Similar to the signal model of the prior art, the time domain signal model usually presents a signal as:

$$y(k) = \sum_{l=0}^{N-1} h(k, l)x(k-l) + z(k),$$

wherein x(k) denotes the input signal, y(k) denotes the received signal, h(k,l) represents the $l^{th}$ channel tap at time instant k, N represents the number of sub-carriers, and z(k) represents noise. The received signal of the N sub-carriers can be expressed in the vector form as y=Hx+z. As time-varying and linear system, the received signal y can be expressed by the following equation:

$$y \approx \{D_1 C_a + D_2 C_b\}x + z,$$

wherein a represents the channel at instant 0, a=[$h_{0,0}$, $h_{0,1}$, . . . , $h_{0,L-1}$], b represents the channel at instant N−1, b=[$h_{N-1,0}$, $h_{N-1,1}$, . . . , $h_{N-1,L-1}$], $C_a$ represents a circulant matrix of channel vector $[a^T, 0^T]^T$, $C_b$ represents a circulant matrix of channel vector $[b^T, 0^T]^T$, $$D_1 = diag\left\{\left[1, \frac{N-2}{N-1}, \ldots, \frac{1}{N-1}, 0\right]\right\}, \text{ and}$$

$$D_2 = diag\left\{\left[0, \frac{1}{N-1}, \ldots, \frac{N-2}{N-1}, 1\right]\right\}.$$

$$D_1 C_a + D_2 C_b$$

used to approximate H.

A signal in the frequency domain can be expressed as $\tilde{y} \approx \tilde{M}\tilde{x}+\tilde{z}$. Using the same approach, the above equations can be rewritten as:

$$\tilde{y} = \tilde{W}c + \tilde{z}, \quad (1)$$

wherein c represents the to-be-determined channel {a, b} and $\tilde{W}$ comprises the transform of $\{D_1, D_2\}$.

In the present invention, channels are estimated according to pilot tones using the following equation:

$$\hat{c}_{LS} = (\tilde{W}_P^H \tilde{W}_P)^{-1} \tilde{W}_P^H \tilde{y}_P, \quad (2)$$

wherein P represents a set of pilot tones, LS represents the least square channel, $\tilde{W}_p$ and are the coefficients relating to the pilots in $\tilde{W}$. The performance of equation (2) is subject to the interference from non-pilot signals. The number of pilots comprised in P is increased in the present invention.

Figure 1:
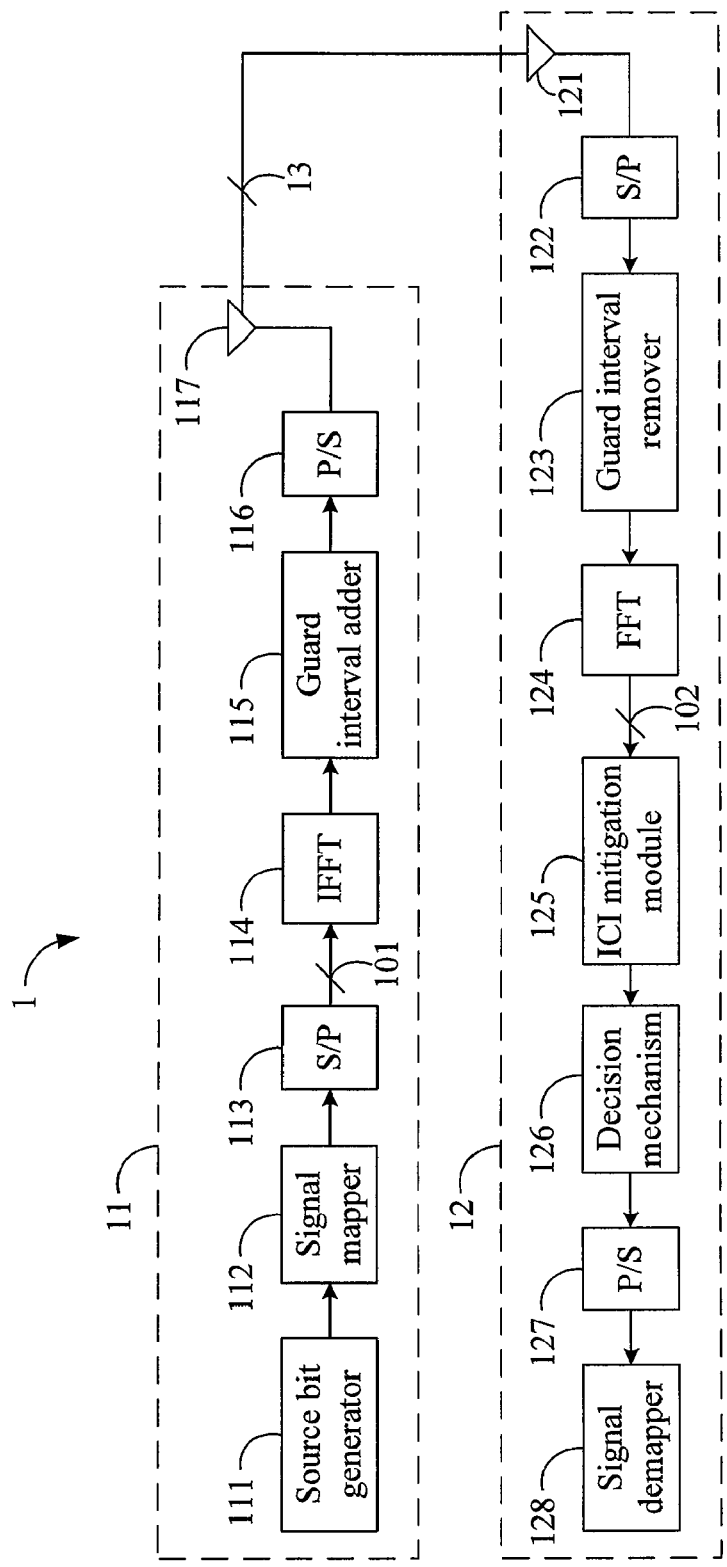
FIG. 1 illustrates a conventional OFDM system.
Figure 2:
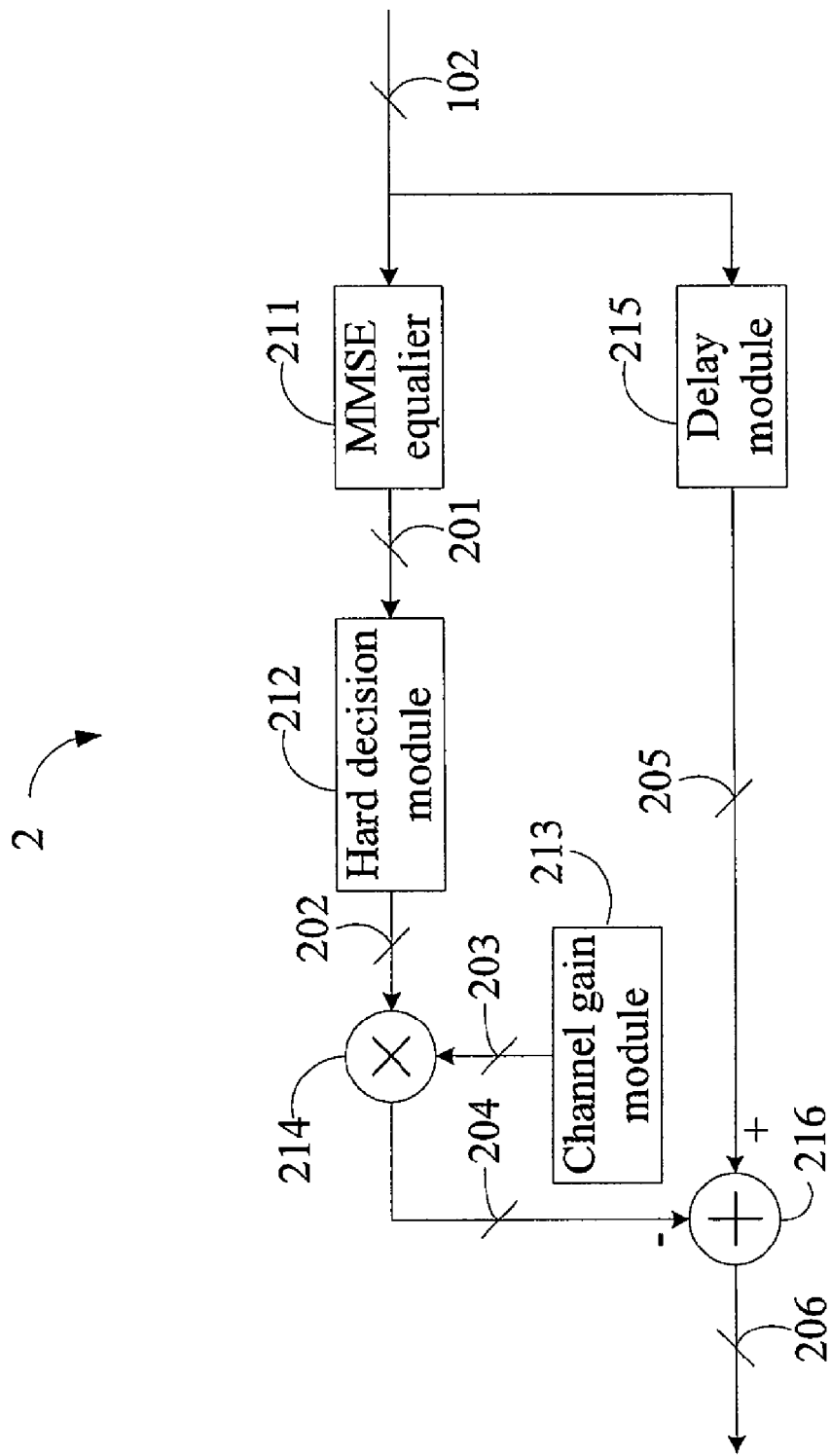
FIG. 2 illustrates a conventional SIC block.
Figure 3:
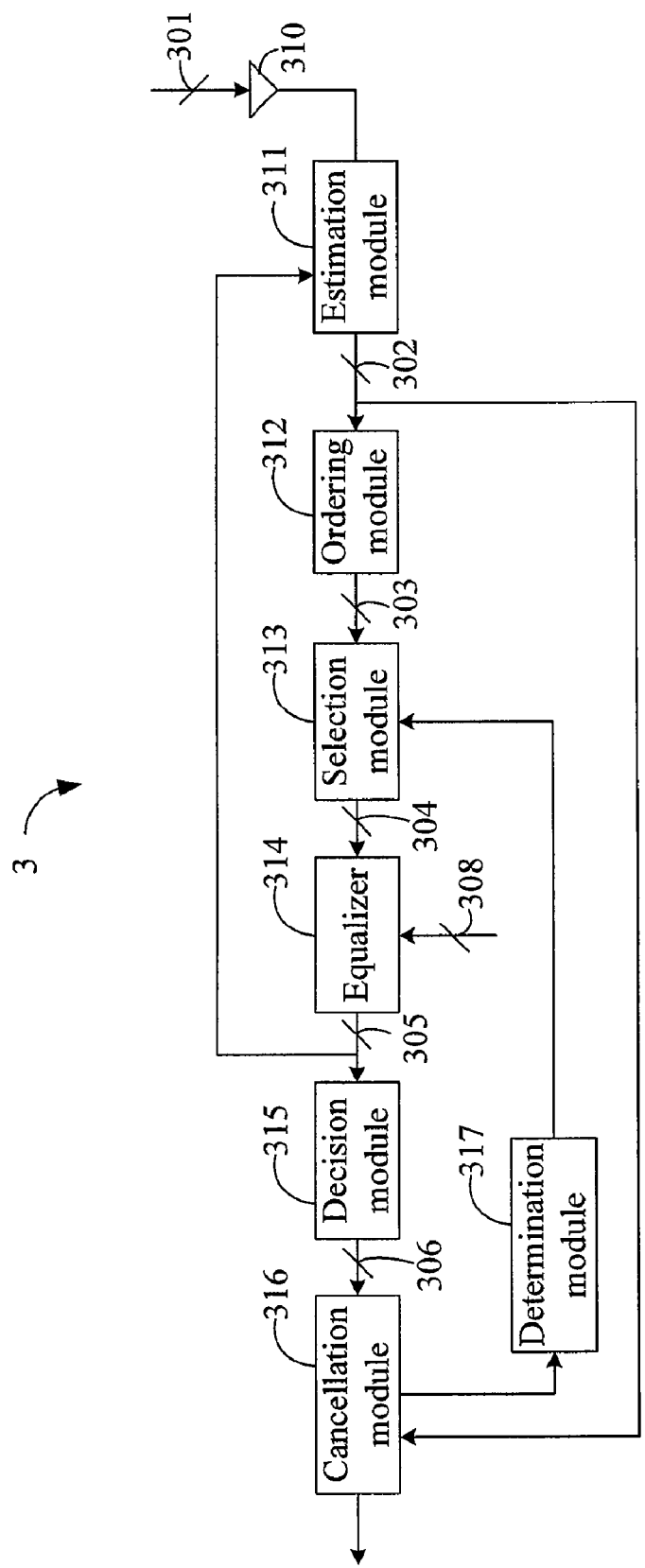
FIG. 3 illustrates a first embodiment of the present invention.

FIG. 3 illustrates a first embodiment of the present invention, which is a wireless receiving system 3 for cancelling an interference of each of a plurality of received signals 301. The wireless receiving system 3 comprises a receiving interface 310, an estimation module 311, an ordering module 312, a selection module 313, an equalizer 314, a decision module 315, a cancellation module 316, and a determination module 317.

The receiving interface receives the received signals 301. The estimation module 311 estimates a channel according to a first predetermined number, $N_p$, of pilot-tones using equation (2), wherein the channel comprises a plurality of sub-carriers an each of the sub-carrier corresponds to one of the received signals. That is, the estimation module 311 estimates the channels to derive $\tilde{H}$ 302. The estimation module 311 performs the estimation according to a least square method. In some other embodiments, the estimation module 311 may use other estimation method. It is noted that the number of pilot tones can be adjusted in other embodiments according to the particular circumstance. The ordering module 312 then decides a decision order relating to the estimated channels. In other words, the ordering module 312 decides $\{S_1, S_2, \ldots, S_N\}$ 303, wherein each of the $S_i$ corresponds to a column of $\tilde{H}$.

Then, the selection module 313 selects a second predetermined number (i.e. the first $N_f$) received signals 304 as first processing signals 308 according to the decision order, $\{S_1, S_2, \ldots, S_N\}$ 303. The equalizer 314 estimates an estimated value 305 for each of the first processing signals 308. To be more specific, the equalizer 314 calculates $\bar{x}_{S_j} = q_{S_j}^H y^{i-1}$ for each of the processing signal 308 and derives the $N_f$ estimated value 305. The equalizer 314 uses the minimum mean square error method to perform the estimation. In other embodiments, the equalizer 314 may use other estimation methods. The decision module 315 determines a decided value 306 for each of the estimated values 305. For simplicity, the decision module 315 uses the hard decisions. Then, the cancellation module 316 cancels the interference of each of the first processing signals 308 according to the corresponding decided value 306 and the corresponding sub-carrier by the equation $\tilde{y}^i = \tilde{y}^{i-1} - \tilde{h}_{S_j} \tilde{d}_{S_j}$. The estimation module 311 then estimates the channel again according to the pilot-tones 301 and the estimated values 305. That is, $N_p$ pilot-tones and $N_f$ estimated values are used.

The determination module 317 may further determine whether some of the received signals is unprocessed, i.e. the corresponding interference has not been canceled yet. If there are other unprocessed received signals, the selection module 313, the equalizer 314, the decision module 315, and the cancellation module 316 continuously repeat the aforementioned operations until all the received signals have been processed. To be more specific, the selection module 313 selects a third predetermined number of the unprocessed received signals as the second processing signals. The equalizer 314 estimates an estimated value for each of the second processing signals. The decision module 315 decides a decided value for each of the estimated values of the second processing signals.

The estimation module 311 estimates the channel according to the pilot-tones and the estimated values of the second processing signals. In other embodiments, the estimation module 311 may estimate the channel according to the pilot-tones and all the estimated values, i.e. the estimated values of the second processing signals and the estimated values of the first processing signals. To be more specific, assuming that the aforementioned operations have been repeated M times, the estimation module 311 of the apparatus provides several approaches for estimating the channel. The first approach uses the $N_p$ pilot-tones and the latest $N_f$ estimated values, while the second approach uses the $N_p$ pilot-tones and all estimated values, i.e. $M \times N_f$ estimated values. Furthermore, for each of the M times, the number of the estimated values do not have to be the same, that is, the number is not limited only to $N_f$ and $N_p$.

Finally, the cancellation module 316 cancels the interference for each of the second processing signals according to the corresponding decided value and the corresponding sub-carrier.

According to the aforementioned arrangements, channels are estimated using the original pilot tones as well as the estimated values generated by the equalizer. Since the channels are adjusted, the signals can be estimated more correctly.

Figure 4:
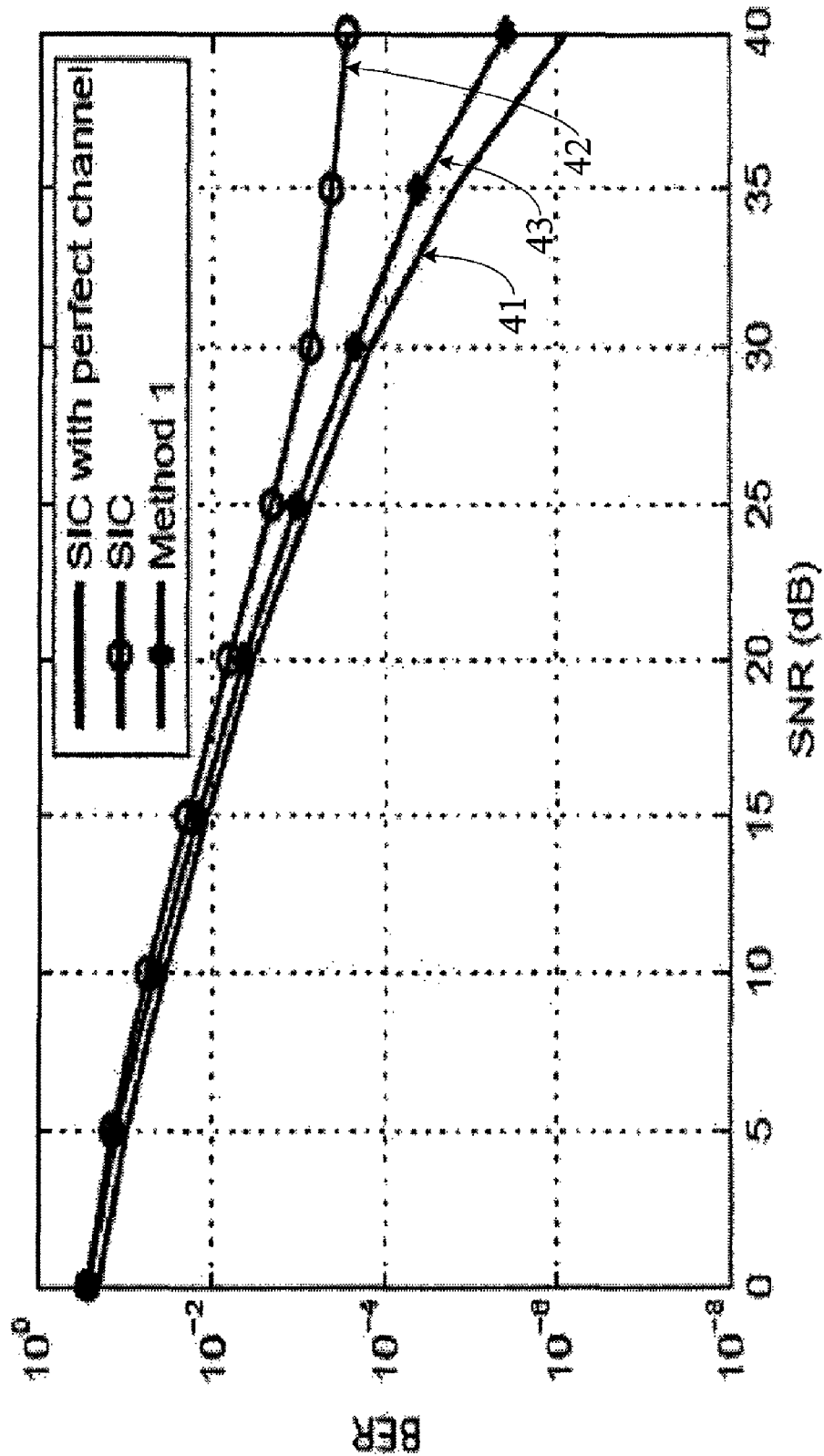
FIG. 4 illustrates a simulation result.

FIG. 4 illustrates a simulation result with the presetting of that the number of carriers is 128, the number of pilot tones is 32, the length of the guard interval is 4, the channel length is 4, the symbols are QPSK symbols, and $N_f$ is 16. In addition, Jakes model is used with $f_d T_s = 0.05$, wherein $f_d$ represents the maximum Doppler frequency shift and $T_s$ OFDM symbol period.

In FIG. 4, the horizontal axis represents the signal to noise ration (SNR), while the vertical axis represents the bit error rate (BER). The curve 41 shows the BER against the SNR of the prior SIC method in the perfect channel. The curve 42 indicates the BER against the SNR of the prior SIC method, while the curve 43 shows the BER against the SNR of the present invention using $N_p$ pilot tones and only $N_f$ estimated values. It is obvious that the present invention has a lower BER. With a larger SNR, the present invention is much better than the prior method. In addition, the present invention uses $N_p$ pilot tones and only $N_f$ estimated values close to the performance in the perfect channel.

Figure 5:
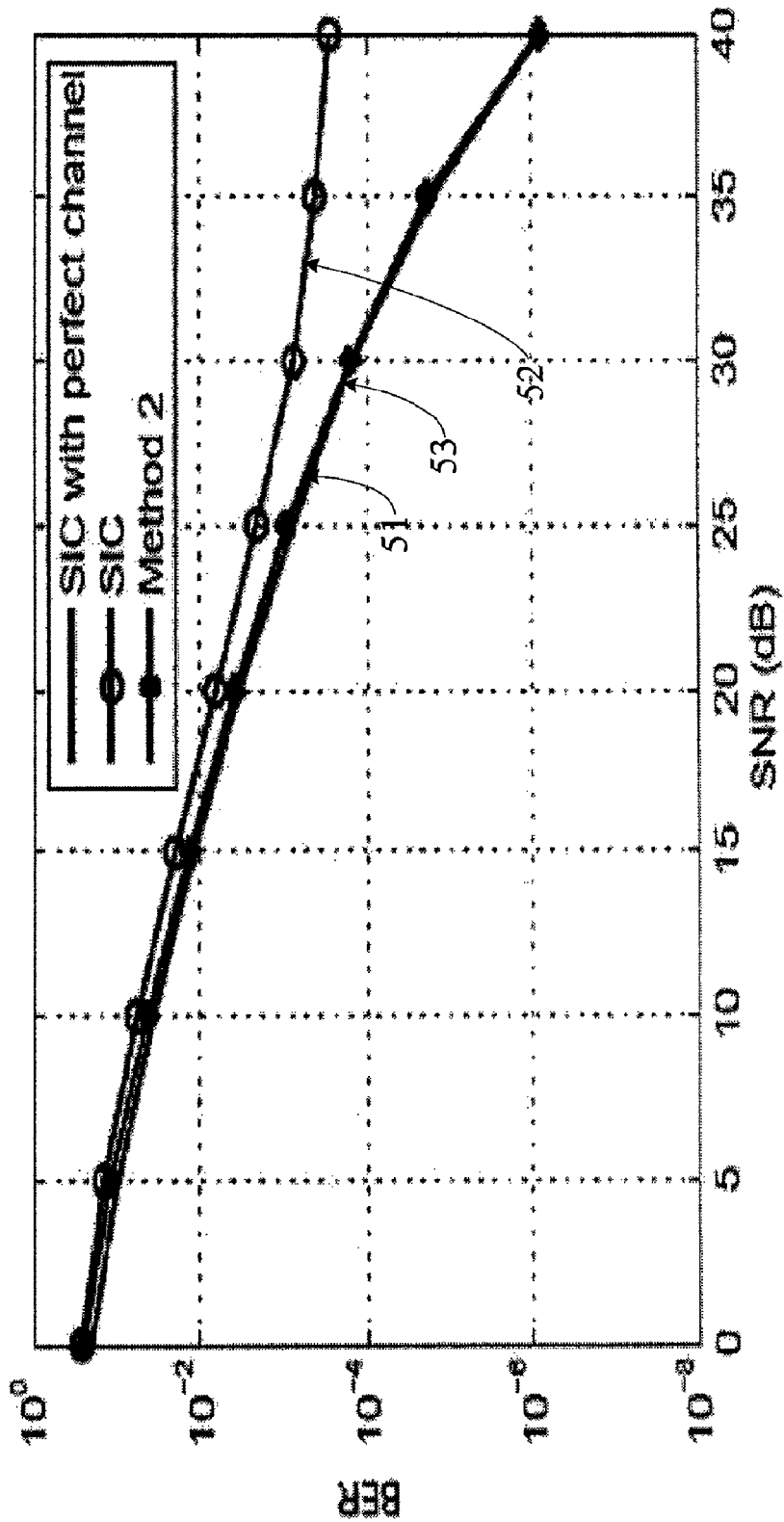
FIG. 5 illustrates another simulation result.

FIG. 5 illustrates another simulation result, wherein the parameters are the same as those used in FIG. 4. In FIG. 5, the horizontal axis represents the signal to noise ratio (SNR), while the vertical axis represents the bit error rate (BER). The curve 51 shows the BER against the SNR of the prior SIC method in the perfect channel. The curve 52 shows the BER against the SNR of the prior SIC method, while the curve 53 shows the BER against the SNR of the present invention using $N_p$ pilot tones and $M \times N_f$ estimated values. In FIG. 5, the curve 53 of the present invention has a lower BER then the curve 52 of the prior method. In addition, the curve 53 is extremely close to the curve 51, the curve generated under perfect channel. Consequently, these curves show that using more pilot-tones and more estimated values to estimate channels, the signals will have a lower BER. That is, using $N_p$ pilot tones and M×N_f estimated values to estimate channels will produce better results than using N_p pilot tones and only N_f estimated values.

Figure 6:
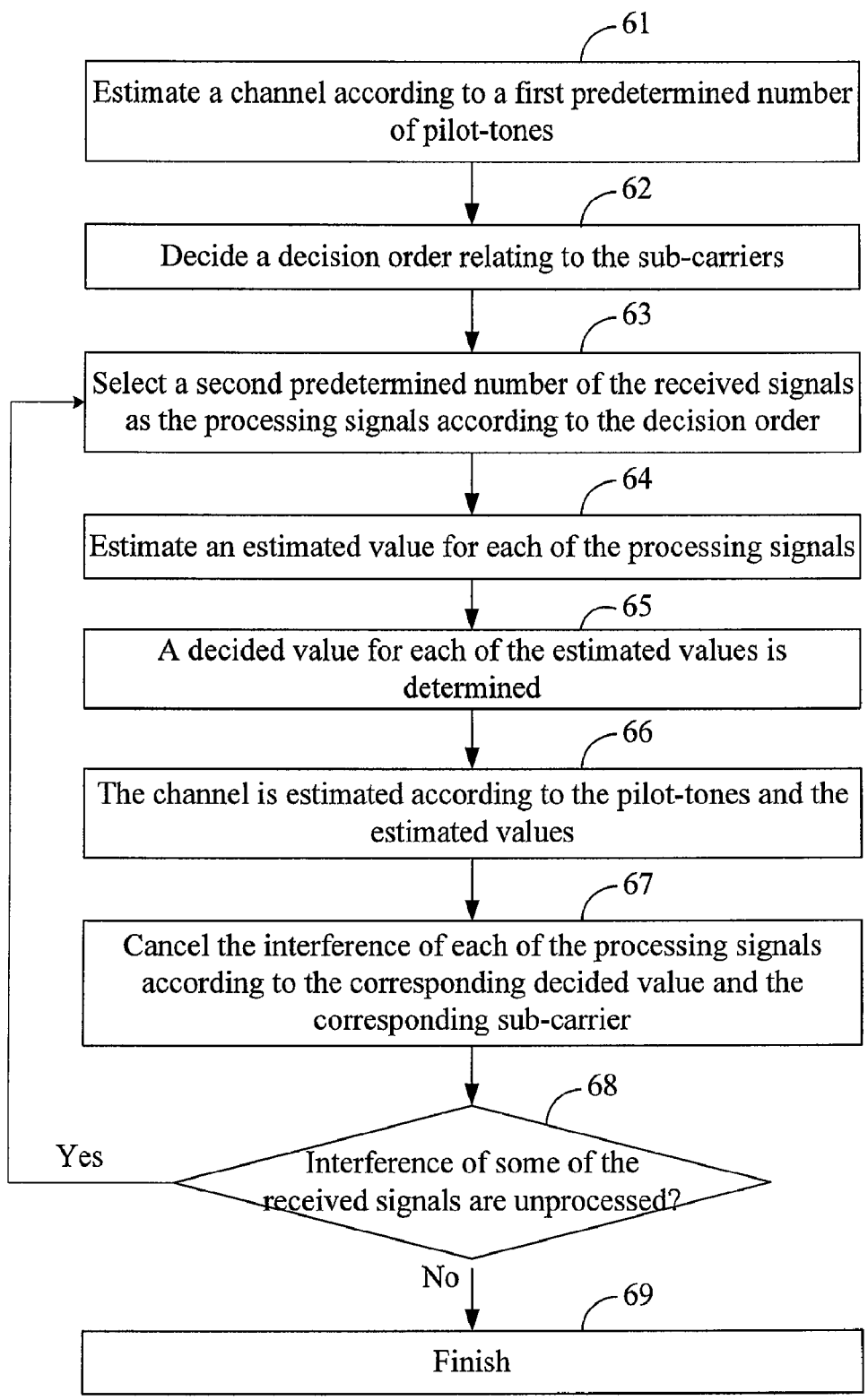
FIG. 6 illustrates a second embodiment of the present invention.

FIG. 6 illustrates a second embodiment of the present invention, which is a flowchart of a method for cancelling an interference of each of a plurality of received signals. Step 61 estimates a channel according to a first predetermined number of pilot-tones, wherein the channel comprises a plurality of sub-carriers and each of the sub-carriers corresponds to one of the received signal. Once the channels have been estimated, step 62 is executed to decide a decision order relating to the sub-carriers. After the decision order is decided, step 63 is executed to select a second predetermined number of the received signals as the processing signals according to the decision order. Next, step 64 is executed to estimate an estimated value for each of the processing signals. A decided value for each of the estimated values is determined in step 65. In step 66, the channel is estimated according to the pilot-tones and the estimated values. Step 67 is executed to cancel the interference of each of the processing signals according to the corresponding decided value and the corresponding sub-carrier. Then, step 68 is executed to determine whether the interferences of some of the received signals are unprocessed. If no, that is all the received signals have been processed, step 69 is executed to complete the method; otherwise, step 63~step 68 is continued to be processed.

In addition to the steps shown in FIG. 6, the second embodiment may perform all of the operations or functions recited in the apparatus as illustrated in the first embodiment.

According to the aforementioned arrangements and steps, the present invention is able to utilize both the original pilot tones and the estimated data to re-estimate channels. Because both the size of the pilot tones (the original pilot tones and the estimated data) is enlarged and the channels are re-estimated iteratively, the estimated channels are more accurate. Consequently, cancelled interferences from each of the received signals are more accurate as well. The resultant received signals are thus, more correct. In addition, to reduce the complexity, a fast algorithm for the MMSE equalizer is utilized.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for canceling an interference of each of a plurality of received signals, comprising the steps of:
   (a) estimating a channel according to a first predetermined number of pilot-tones, the channel comprising a plurality of sub-carriers, each of the sub-carrier corresponding to one of the received signal;
   (b) deciding a decision order relating to the sub-carriers;
   (c) selecting a second predetermined number of the received signals as the first processing signals according to the decision order;
   (d) estimating an estimated value for each of the first processing signals;
   (e) deciding a decided value for each of the estimated values;
   (f) estimating the channel according to the pilot-tones and the estimated values; and
   (g) canceling the interference of each of the first processing signals according to the corresponding decided value and the corresponding sub-carrier.

2. The method of claim 1, further comprising the steps of:
   (h) determining that the interference of some of the received signals being unprocessed;
   (i) selecting a third predetermined number of the unprocessed received signals as the second processing signals; and
   (j) repeating the step (d), step (e), step (f), and step (g) in sequence.

3. The method of claim 2, wherein the step (f) executed in step (j) estimates the channel further according to the estimated values of the first processing signals.

4. The method of claim 1, wherein step (a) and step (f) estimate by a least square method.

5. The method of claim 1, wherein step (d) estimates by a minimum mean square error.

6. The method of claim 1, wherein step (d) estimates each of the estimated values according to the corresponding processing signal and the corresponding sub-carrier.

7. An apparatus for canceling an interference of each of a plurality of received signals, comprising:
   an estimation module for estimating a channel according to a first predetermined number of pilot-tones and for estimating the channel according to the pilot-tones and a plurality of estimated values, wherein the channel comprises a plurality of sub-carriers and each of the sub-carriers corresponds to one of the received signals;
   an ordering module for deciding a decision order relating to the sub-carriers;
   a selection module for selecting a second predetermined number of the received signals as the first processing signals relating to the decision order;
   an equalizer for estimating the estimated values, each of the estimated values corresponding to one of the first processing signals;
   a decision module for deciding a decided value for each of the estimated values; and
   a cancellation module for canceling the interference of each of the first processing signals according to the corresponding decided value and the corresponding sub-carrier.

8. The apparatus of claim 7, further comprising:
   a determination module for determining that the interface of some of the received signals being unprocessed;
   wherein the selection module further selects a third predetermined number of the unprocessed received signals as the second processing signals, the equalizer further estimates an estimated value for each of the second processing signals, the decision module further decides a decided value for each of the estimated values of the second processing signals; the estimation module further estimates the channel according to the pilot-tones and the estimated values of the second processing signals, and the cancellation module further cancels the interference for each of the second processing signals according to the corresponding decided value and the corresponding sub-carrier.

9. The apparatus of claim 8, wherein the estimation module estimates the channel according to the estimated values of the first processing signals and the estimated values of the second processing signals.

10. The apparatus of claim 7, wherein the estimation module estimates according to a least square method.

11. The apparatus of claim 7, wherein the equalizer estimates according to a minimum mean square error.

12. The apparatus of claim 7, wherein the equalizer estimates each of the estimated values according to the corresponding processing signal and the corresponding sub-carrier.

13. A wireless receiving system for canceling an interference of each of a plurality of received signals, comprising:

a receiving interface for receiving the received signals;

an estimation module for estimating a channel according to a first predetermined number of pilot-tones and for estimating the channel according to the pilot-tones and a plurality of estimated values, wherein the channel comprises a plurality of sub-carriers and each of the sub-carriers corresponds to one of the received signals;

an ordering module for deciding a decision order relating to the sub-carriers;

a selection module for selecting a second predetermined number of the received signals as the first processing signals according to the decision order;

an equalizer for estimating the estimated values, each of the estimated values corresponding to one of the first processing signals;

a decision module for deciding a decided value for each of the estimated values; and a cancellation module for canceling the interference of each of the first processing signals according to the corresponding decided value and the corresponding sub-carrier.

14. The wireless receiving system of claim 13, further comprising:

a determination module for determining that the interference of some of the received signals being unprocessed;

wherein the selection module further selects a third predetermined number of the unprocessed received signals as the second processing signals, the equalizer further estimates an estimated value for each of the second processing signals, the decision module further decides a decided value for each of the estimated values of the second processing signals; the estimation module further estimates the channel according to the pilot-tones and the estimated values of the second processing signals, and the cancellation module further cancels the interference for each of the second processing signals according to the corresponding decided value and the corresponding sub-carrier.

15. The wireless receiving system of claim 14, wherein the estimation module estimates the channel according to the estimated values of the first processing signals and the estimated values of the second processing signals.

16. The wireless receiving system of claim 13, wherein the estimation module estimates according to a least square method.

17. The wireless receiving system of claim 13, wherein the equalizer estimates according to a minimum mean square error.

18. The wireless receiving system of claim 13, wherein the equalizer estimates each of the estimated values according to the corresponding processing signal and the corresponding sub-carrier.

* * * * *